May 12, 1942.    F. KOCH    2,283,154
MILLING MACHINE
Filed Dec. 21, 1939    2 Sheets-Sheet 1
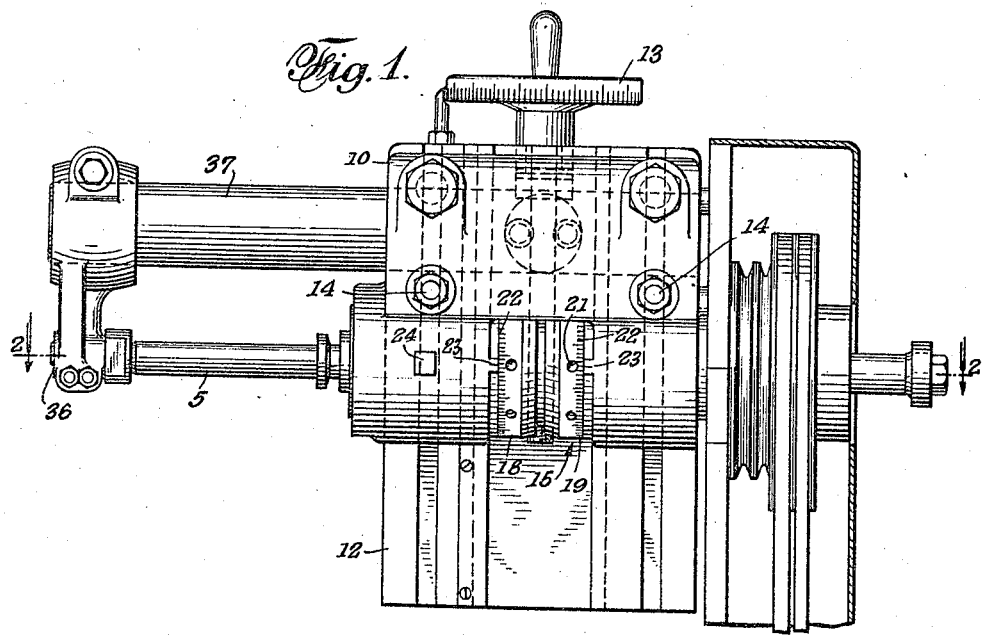
Fig. 1.
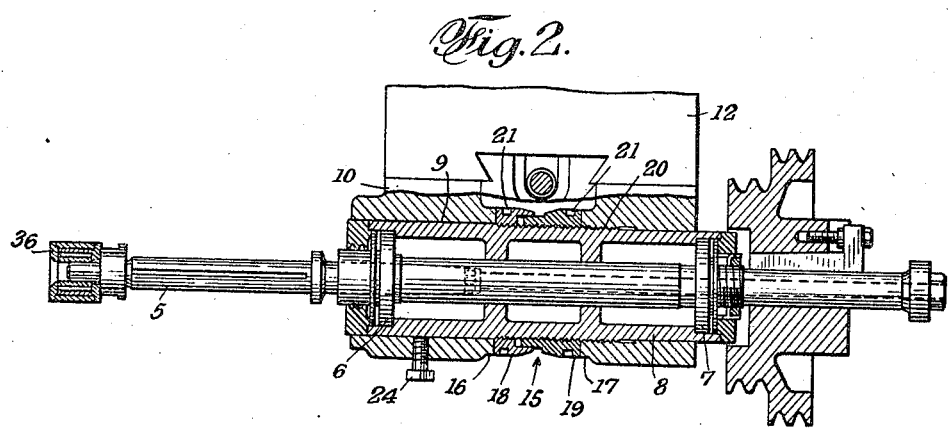
Fig. 2.
INVENTOR
FREDERICK KOCH
BY
ATTORNEY

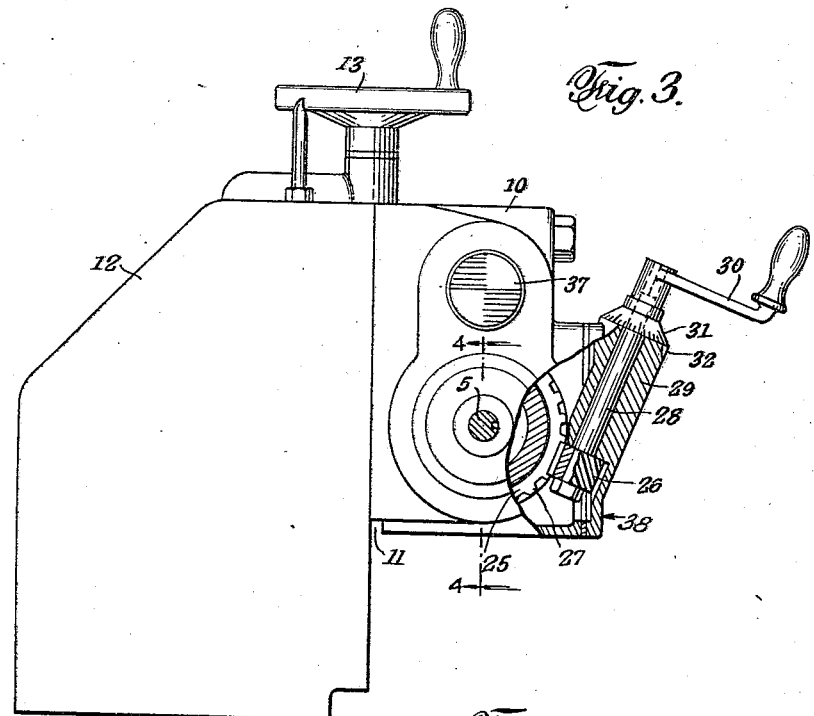
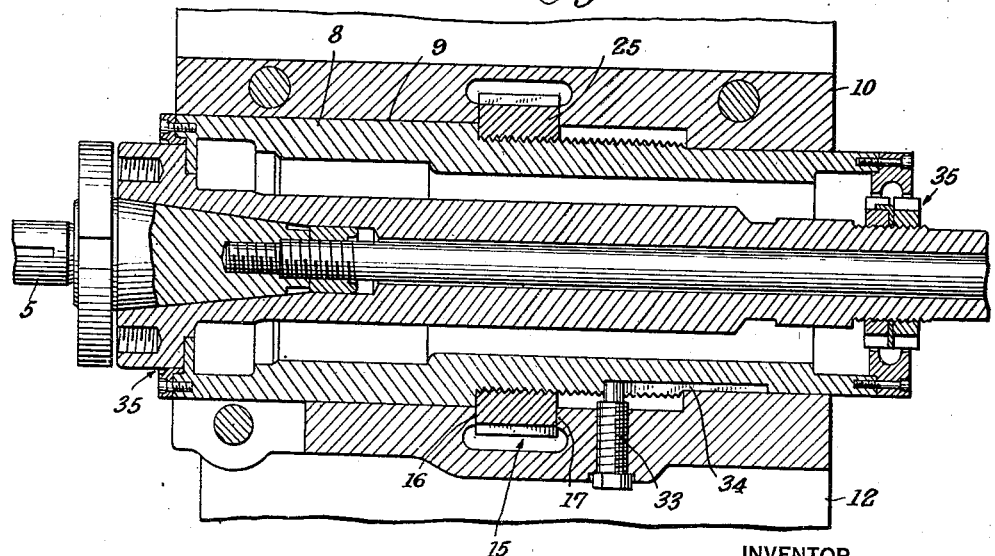

Patented May 12, 1942

2,283,154

UNITED STATES PATENT OFFICE 2,283,154

MILLING MACHINE

Frederick Koch, Sparta, N. J., assignor to Associated Patentees, Inc., Ampere, N. J., a corporation of New Jersey Application December 21, 1939, Serial No. 310,323

1 Claim. (Cl. 90—16)

The invention disclosed herein relates to milling machines and is a continuation in part of patent application, Ser. No. 165,033 filed September 22, 1937, Patent 2,202,210, dated May 28, 1940.

The objects of the invention are to provide practical and satisfactory means for effecting longitudinal, horizontal adjustments of the cutter spindle and particularly to enable immediate, quick adjustments and automatic locking of the spindle in adjusted relation.

The objects mentioned and other desirable objects are attained by the novel features of construction, combinations and relations of parts hereinafter described, illustrated in the accompanying drawings and broadly covered in the claim.

The drawings illustrate two of the present commercial embodiments of the invention, but structure may be changed as regards this disclosure, all within the true intent and scope of the invention as defined in the claim.

Fig. 1 is a broken part sectional view illustrating the head portion of a milling machine having the invention incorporated therein.

Fig. 2 is a broken sectional view as on substantially the plane of line 2—2 of Fig. 1.

Fig. 3 is a broken part sectional and part elevational view of a modified form of the invention.

Fig. 4 is an enlarged broken sectional view as on substantially the plane of line 4—4 of Fig. 3.

In the several views, the cutter spindle is designated 5, and is shown journalled in frictionless bearings, such as taper roll bearings at 6, 7, seated in relatively spaced relation in the opposite ends of a bearing sleeve 8, longitudinally shiftable in a bore 9, in the head portion 10 of the machine.

The spindle head 10 is shown mounted for vertical adjustment at 11, on the upper stationary head portion 12, of the machine. A hand wheel is indicated at 13, for effecting the vertical adjustments of the spindle head and means may be provided for clamping this head in positions of vertical adjustment, such as the clamping bolts at 14.

The intermediate portion of the passage 9, in which the bearing sleeve is mounted is opened up as indicated at 15, to provide opposed solid abutment shoulders 16, 17, for coaction with the screw mechanism for effecting longitudinal adjustments of the spindle.

In the first illustrated form of the invention, the screw mechanism comprises a pair of overlapping thrust rings 18, 19, screwed on the externally threaded portion 20, of the bearing sleeve and designed to engage the opposed thrust shoulders 16, 17. These rings are preferably provided with some means for enabling ready adjustment of the same, such as the notches or seats 21, for a spanner wrench or other actuating tool. The adjustable thrust rings 18, 19, are shown marked with graduations 22, registering with index markings 23, for assisting in accurate adjustment of the parts.

By loosening one thrust ring to a predetermined extent, such as may be indicated on the scale on that ring and then tightening the other ring, the bearing sleeve and the entire spindle assembly may be accurately shifted a desired extent and secured in such shifted relation. If desired, one or more set screws such as indicated at 24, may be provided for locking the bearing sleeve and parts carried thereby in adjusted position.

The second illustrated form of the invention, Figs. 3 and 4, differs from the first, primarily in that a single screw ring 25, effects adjustment of the bearing sleeve in both directions and further in that said adjusting ring is rotated by a spiral pinion 26, engaging spiral teeth 27, cut in the exterior of the ring, said pinion being carried by a shaft 28, journalled in an inclined bearing 29, on the side of the head and operated by a hand crank 30. This shaft is shown as carrying a graduated scale 31, registering with an index 32.

The bearing sleeve is shown as held against rotation by a screw 33, engaging in a key groove 34, cut in the sleeve.

The helical or worm gearing operating means enables quick and accurate adjustment of the screw ring and leaves the latter locked in the position of adjustment. The single ring takes up less room than the two rings and hence requires less open space at the center of the bearing sleeve passage and permits closer spacing of the opposed thrust shoulders at 16, 17.

The opening 15 extending transversely in through the side of the spindle head, to provide said thrust shoulders, may be closed by a removable cover plate, such as indicated at 38 and this plate as shown in Fig. 3 may carry the bearing 29 for the spindle adjusting shaft 28.

In both constructions the ends of the bearing sleeve may be closed by suitable seals at 35, for excluding cuttings and protecting the bearings from cutting oils and the like.

The inclination of the adjusting shaft 28, away from the bearing sleeve passage provides necessary space at the outer end of said shaft for free operation of the hand crank. The latter may be of the readily removable type, so that it may be taken off after adjustments are effected to prevent any accidental shifting of the cutter spindle. The outboard end of the spindle may be supported in a needle bearing, such as indicated at 36, carried by the overarm support 37.

What is claimed is:

In a milling machine, the combination of a spindle head having a bearing sleeve passage extending therethrough and a transverse opening through one side of the head of larger diameter than said passage and extending across an intermediate portion of said passage between opposite ends of the same to provide integral thrust abutment shoulders about said passage, opposed to each other and spaced a distance apart equal to the width of said opening, an internally threaded screw ring of greater diameter than said passage and having external gear teeth on the periphery of the same, said screw ring being insertible through said side of the head into said transverse opening between said opposed thrust abutment shoulders, a bearing sleeve longitudinally shiftable in said passage and having external screw threads engaged by the internal threads of said screw ring, a spindle journalled in said bearing sleeve and shiftable longitudinally therewith, a cover plate over said opening at the side of the head, a bearing carried by and extending through said cover plate, an adjusting shaft journalled in said bearing, means at the outer end of said shaft for rotating the same and a pinion on the inner end of said shaft in engagement with said gear teeth on the periphery of said screw ring.

FREDERICK KOCH.